United States Patent
Arimura et al.

(10) Patent No.: US 9,473,787 B2
(45) Date of Patent: Oct. 18, 2016

(54) VIDEO CODING APPARATUS AND VIDEO CODING METHOD

(71) Applicant: Panasonic Intellectual Property Management Co., Ltd., Osaka (JP)

(72) Inventors: Koji Arimura, Osaka (JP); Kazuhito Kimura, Shiga (JP); Hideyuki Ohgose, Osaka (JP); Hiroshi Arakawa, Nara (JP); Kiyofumi Abe, Osaka (JP); Kazuma Sakakibara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 41 days.

(21) Appl. No.: 14/660,419

(22) Filed: Mar. 17, 2015

(65) Prior Publication Data

US 2015/0271516 A1   Sep. 24, 2015

(30) Foreign Application Priority Data

Mar. 18, 2014 (JP) ................. 2014-054641
Mar. 5, 2015 (JP) ................. 2015-043073

(51) Int. Cl.
  *H04N 7/12* (2006.01)
  *H04N 11/02* (2006.01)
  *H04N 11/04* (2006.01)
  *H04N 19/513* (2014.01)
  *H04N 19/56* (2014.01)
  *H04N 19/172* (2014.01)
  *H04N 19/176* (2014.01)

(52) U.S. Cl.
  CPC .......... *H04N 19/513* (2014.11); *H04N 19/172* (2014.11); *H04N 19/176* (2014.11); *H04N 19/56* (2014.11)

(58) Field of Classification Search
  None
  See application file for complete search history.

(56) References Cited

U.S. PATENT DOCUMENTS

| | | | |
|---|---|---|---|
| 2013/0170549 A1* | 7/2013 | Li | H04N 19/52 375/240.16 |
| 2013/0272413 A1* | 10/2013 | Seregin | H04N 19/52 375/240.16 |
| 2013/0272415 A1* | 10/2013 | Zhou | H04N 19/176 375/240.16 |
| 2014/0098882 A1* | 4/2014 | Zhang | H04N 13/0048 375/240.16 |
| 2014/0105302 A1* | 4/2014 | Takehara | H04N 19/00721 375/240.15 |
| 2014/0146876 A1* | 5/2014 | Takehara | H04N 19/00036 375/240.02 |
| 2014/0241436 A1* | 8/2014 | Laroche | H04N 19/00684 375/240.16 |

OTHER PUBLICATIONS

Bross, B. et al., "High Efficiency Video Coding (HEVC) text specification draft 10 (for FDIS & Last Call)," Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013; 310 pages.

* cited by examiner

*Primary Examiner* — Frederick Bailey
*Assistant Examiner* — Talha M Nawaz
(74) *Attorney, Agent, or Firm* — McDermott Will & Emery LLP

(57) ABSTRACT

In an exemplary embodiment, in order to avoid enlargement of a circuit scale to perform coding processing in real time, a block size of a PU (evaluation PU (Prediction Unit)) used to evaluate a merge mode is restricted and the number of evaluation target merge candidates is restricted. In the case where the evaluation PU has the block size in which a CU (Cording Unit) is divided, at least one merge candidate common to a merge candidate list of a PU (inclusion PU) having the block size including the evaluation PU and a merge candidate list of each of a plurality of evaluation PUs is selected as the evaluation target merge candidate from the merge candidate lists of the evaluation PUs. In performing cost evaluation processing for the evaluation PU, cost evaluation processing is simultaneously performed on the inclusion PU using a calculated prediction residual.

8 Claims, 8 Drawing Sheets

FIG. 1

| CU size | PU size | TU size |
|---|---|---|
| 64x64 | 64x64, 64x32, 32x64, 32x32, 64x16, 64x48, 16x64, 48x64 | 32x32, 16x16, 8x8, 4x4 |
| 32x32 | 32x32, 32x16, 16x32, 16x16, 32x8, 32x24, 8x32, 24x32 | 32x32, 16x16, 8x8, 4x4 |
| 16x16 | 16x16, 16x8, 8x16, 8x8 16x4, 16x12, 4x16, 12x16 | 16x16, 8x8, 4x4 |
| 8x8 | 8x8, 8x4, 4x8 | 8x8, 4x4 |

FIG. 3
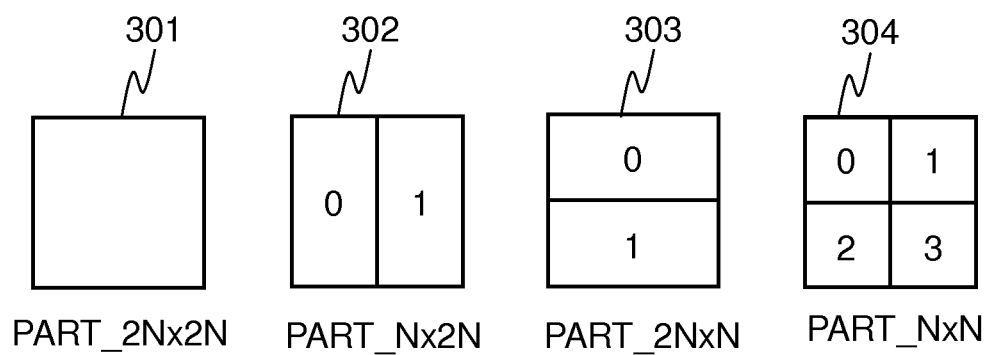
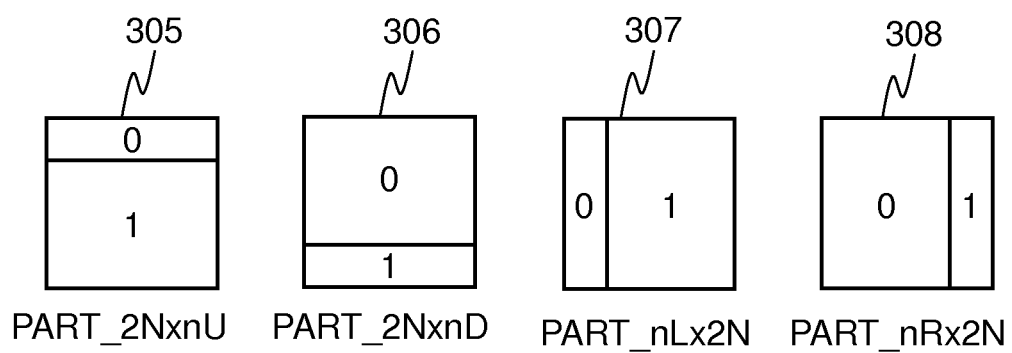

FIG. 4B
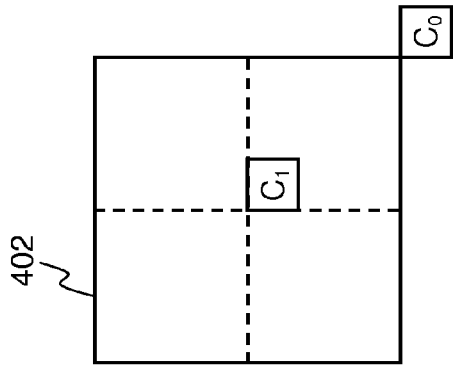
(B) Temporal merging candidate
FIG. 4A
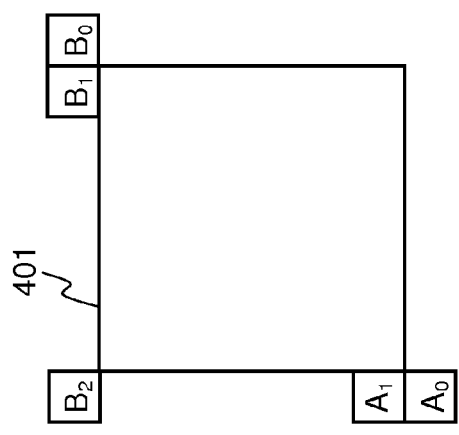
(A) Spatial merging candidate
FIG. 4C
| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |
(C) Combined bi-predictive merging candidate

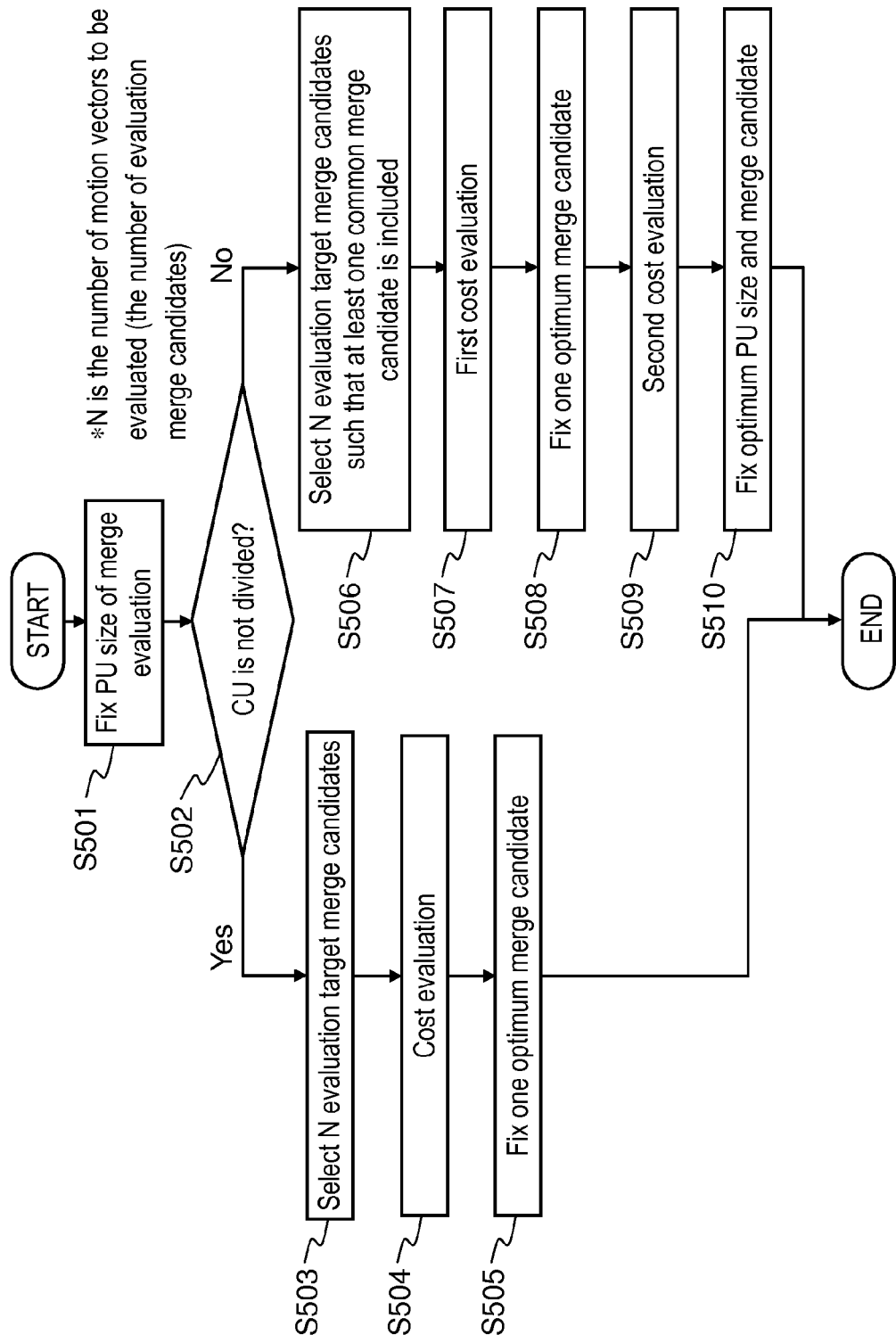

FIG. 6A

Cost_PU(mv) = SAD(mv) + Cost_Header(Qp, mv)

FIG. 6B

Cost_PU(mv) = SSD(mv) + Cost_Header(Qp, mv)

FIG. 7

| PU | MrgIdx=0 | MrgIdx=1 | MrgIdx=2 | MrgIdx=3 | MrgIdx=4 |
|---|---|---|---|---|---|
| PART_2Nx2N | MV_a | MV_b | MV_c | MV_d | MV_e |
| PU0 of PART_Nx2N | MV_a | MV_f | MV_d | MV_c | MV_e |
| PU1 of PART_Nx2N | MV_c | MV_e | MV_f | MV_g | MV_h |

FIG. 8

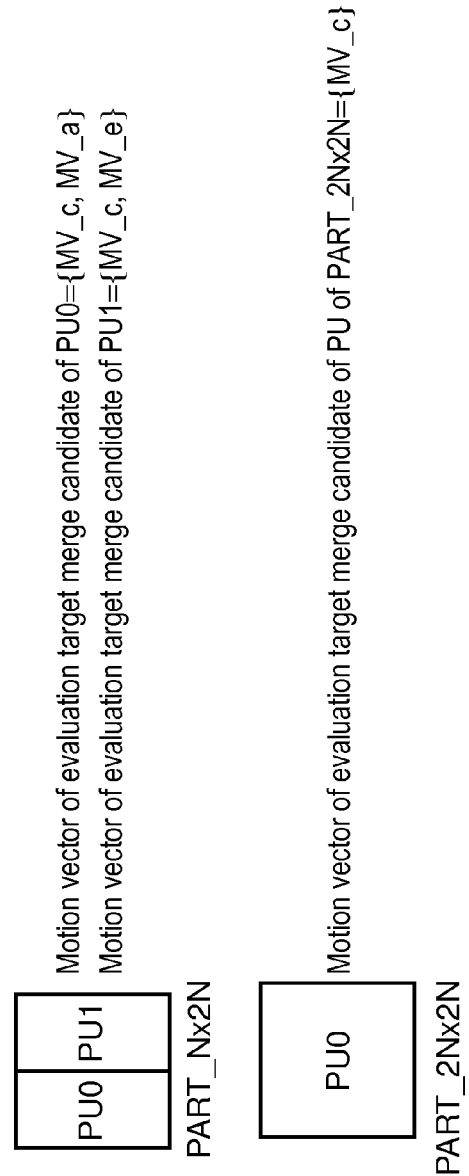

Merge evaluation PU size: PART_Nx2N
Evaluation target merge candidate: 2

PU0 | PU1    Motion vector of evaluation target merge candidate of PU0={MV_c, MV_a}
           Motion vector of evaluation target merge candidate of PU1={MV_c, MV_e}

PART_Nx2N

PU0    Motion vector of evaluation target merge candidate of PU of PART_2Nx2N={MV_c}

PART_2Nx2N

FIG. 9B  SAD(MV_c, 2Nx2N, PU0) = SAD(MV_c, Nx2N, PU0) + SAD(MV_c, Nx2N, PU1)

FIG. 9C  SSD(MV_c, 2Nx2N, PU0) = SSD(MV_c, Nx2N, PU0) + SSD(MV_c, Nx2N, PU1)

VIDEO CODING APPARATUS AND VIDEO CODING METHOD

RELATED APPLICATIONS

This application claims the benefit of Japanese Application No. 2014-054641, filed on Mar. 18, 2014 and Japanese Application No. 2015-043073, filed on Mar. 5, 2015, the disclosures of which Applications are incorporated by reference herein.

BACKGROUND

1. Field

The present disclosure relates to a video coding apparatus and a video coding method.

2. Description of the Related Art

A standardization activity of a next-generation video coding system called HEVC (High Efficiency Video Coding) is currently progressed by a cooperation of ITU-T and ISO/IEC. For example, the standardization activity is disclosed in an HEVC written standard (draft) (High Efficiency Video Coding (HEVC) text specification draft 10 (for FDIS & Last Call)).

In the conventional video coding standard of H.264, coding is performed by unit of macro block having a 16-by-16-pixel size. On the other hand, in the HEVC, the coding is performed by unit of not only the 16-by-16-pixel size but also a CU (Cording Unit) that is one of four kinds of sizes of a 64-by-64 pixel, a 32-by-32 pixel, a 16-by-16 pixel, and an 8-by-8 pixel as illustrated in FIG. 1. As illustrated in FIG. 1, various sizes can be selected as the size of a PU (Prediction Unit) used in the inter prediction in the CU.

In the video coding standard of H.264, a direct mode is adopted in the coding of a motion vector. In the direct mode of H.264, one motion vector of a current macro block is fixed from a spatially or temporally near macro block. On the other hand, in the HEVC, a merge mode is introduced in order to enhance coding efficiency rather than the direct mode. In the merge mode of the HEVC, a motion vector candidate list (hereinafter, referred to as a "merge candidate list") including a maximum of five motion vector candidates as index information is produced from the PUs spatially or temporally near the current PU. The motion vector is selected from the merge candidate list, and an index (hereinafter, referred to as a "merge candidate index") on the merge candidate list of the selected motion vectors is coded in each PU, thereby improving the coding efficiency.

SUMMARY

In the merge mode, eight kinds of PU sizes can be selected with respect to one CU size. In this case, the merge candidate list including the maximum of five motion vector candidates as the index information is generated with respect to each of the eight kinds of PUs. A processing amount increases in the case where the motion vector candidates described in all the merge candidate lists generated for all the PU sizes are evaluated. The coding processing is performed in real time, which leads to enlargement of a circuit scale. However, the coding efficiency is degraded when the actually-evaluated PU size or the motion vector candidate is simply restricted in order to decrease the processing amount in performing the merge mode.

Therefore, the present disclosure provides a video coding apparatus that can suppress the degradation of the coding efficiency while preventing the enlargement of the circuit scale.

According to one aspect of the present disclosure, a video coding apparatus includes: an acquisition part that acquires an original image of a coding target; a prediction image generator that performs at least inter prediction on the acquired original image at each of predetermined regions, and generates a prediction image at the region by referring to at least one index from a candidate list in which a plurality of indexes of motion vectors to be candidates are described; a difference calculator that generates a residual component with respect to the original image by calculating a difference between the prediction image generated at each of the regions and an image being in the original image and corresponding to the prediction image; and a coder that generates an output image stream by performing coding processing on the residual component.

At this point, the prediction image generator generates the candidate list, in which the plurality of indexes of motion vectors to be the candidates are described, for being referred to during the inter prediction for each of at least three inter prediction blocks among the plurality of inter prediction blocks defined in a video coding standard and to be applied to the original image, using an index described in the generated candidate list, the prediction image generator calculates an evaluation value indicating coding efficiency during the use of the index and generates the prediction image based on the calculated evaluation value. When the motion vector that is listed as a candidate common to the candidate lists of at least the three blocks is included, the prediction image generator sets the index used to calculate the evaluation value and listed in the generated candidate list such that at least one common motion vector is included.

BRIEF DESCRIPTION OF DRAWINGS

FIG. 1 is a view illustrating a selectable block size of HEVC;

FIG. 3 is a view illustrating a PU size of the HEVC;

FIG. 4A is a view illustrating a merge candidate of the HEVC;

FIG. 4B is a view illustrating the merge candidate of the HEVC;

FIG. 4C is a view illustrating the merge candidate of the HEVC;

FIG. 5 is a view illustrating cost evaluation processing for a merge mode in the first exemplary embodiment;

FIG. 6A is an equation used to express an evaluation value of the cost evaluation processing for the merge mode in the exemplary embodiment;

FIG. 6B is an equation used to express the evaluation value of the cost evaluation processing for the merge mode in the exemplary embodiment;

FIG. 7 is a view illustrating examples of motion vectors in a merge candidate list of two evaluation PUs and an inclusion PU in the exemplary embodiment;

FIG. 8 is a view illustrating a selected evaluation target merge candidate in the exemplary embodiment;

FIG. 9B is an equation used to obtain the prediction residual of the inclusion PU; and FIG. 9C is an equation used to obtain the prediction residual of the inclusion PU.

DETAILED DESCRIPTION OF THE PREFERRED EMBODIMENT

Hereinafter, an exemplary embodiment will be described in detail with reference to the drawings. However, the detailed description beyond necessity is occasionally not given. For example, the detailed description of the well-known item or the overlapping description of the substantially same configuration is occasionally not given. This is because unnecessary redundancy of the following description is avoided for the purpose of the easy understanding of those skilled in the art.

The accompanying drawings and the following description are provided in order that those skilled in the art sufficiently understand the present disclosure, but the claims are not limited to the accompanying drawings and the following description.

Exemplary Embodiment

For example, video coding apparatus 100 according to an exemplary embodiment is made by a microprocessor incorporated in a video camera, a digital camera, a video recorder, a mobile phone, a handheld terminal, and a personal computer. Video coding apparatus 100 of the exemplary embodiment performs coding processing on video data according to an HEVC (High Efficiency Video Coding) standard for video image.

Video coding apparatus 100 restricts a block size of a PU (evaluation PU (Prediction Unit)) by which a merge mode is evaluated, and restricts a number of evaluation target merge candidates. In the case where the evaluation PU has the block size in which a CU (Cording Unit) is divided, at least one merge candidate common to a merge candidate list of a PU (inclusion PU) having the block size including the evaluation PU and a merge candidate list of each of a plurality of evaluation PUs is selected as an evaluation target merge candidate from the merge candidate lists of the evaluation PUs. In performing cost evaluation processing for the evaluation PU, cost evaluation processing is simultaneously performed on the inclusion PU using a calculated prediction residual. Therefore, the degradation of the coding efficiency can be suppressed while the enlargement of the circuit scale is prevented.

A configuration and an operation of video coding apparatus 100 of the exemplary embodiment will be described below with reference to the drawings.

1-1. Configuration of Video Coding Apparatus

Figure 2:
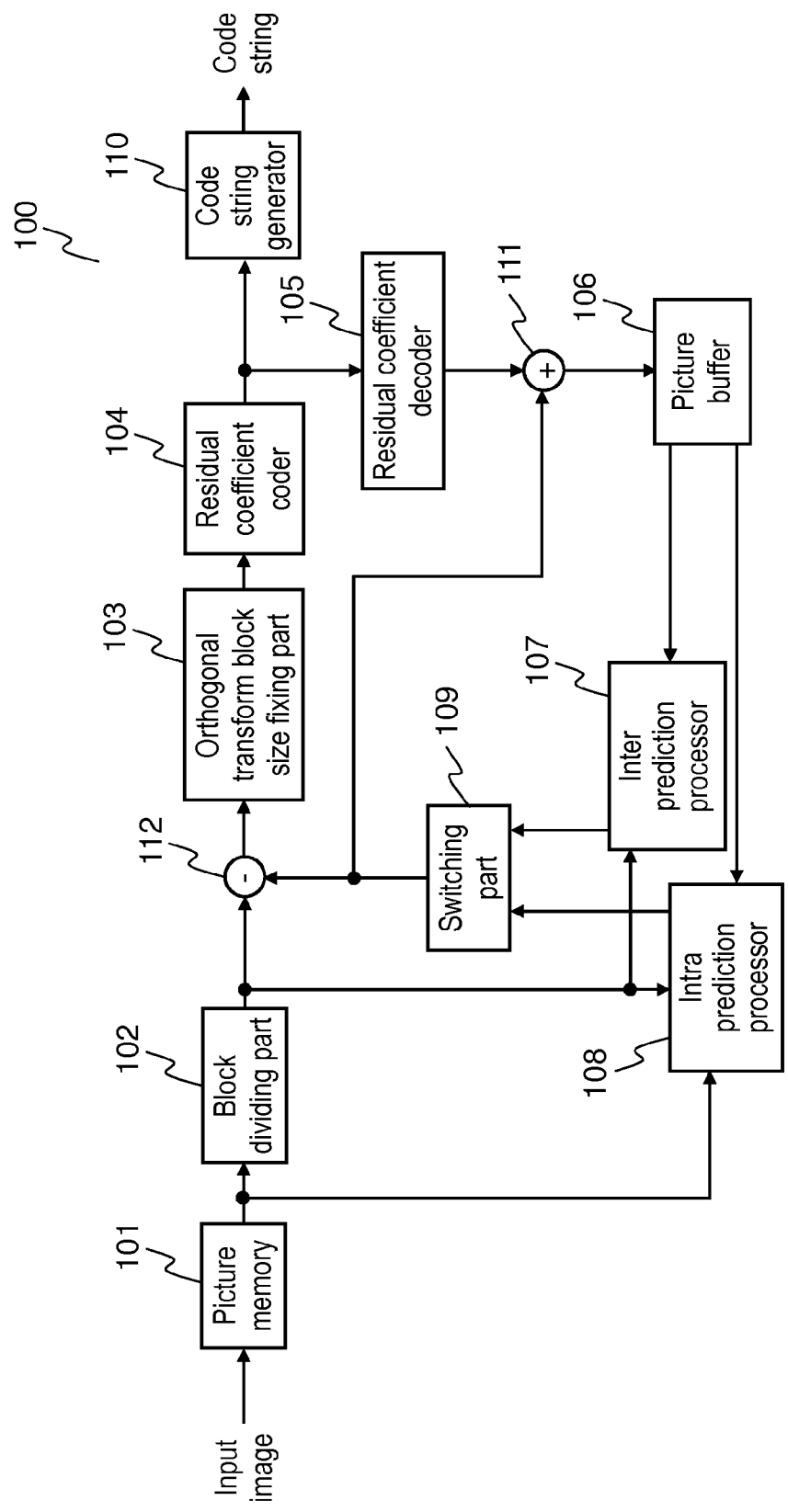
FIG. 2 is a schematic diagram illustrating a video coding apparatus according to an exemplary embodiment.

The configuration of video coding apparatus 100 will be described. FIG. 2 is a block diagram illustrating the configuration of video coding apparatus 100 of the exemplary embodiment.

As illustrated in FIG. 2, video coding apparatus 100 includes picture memory 101, block dividing part 102, orthogonal transform block size fixing part 103, residual coefficient coder 104, residual coefficient decoder 105, picture buffer 106, inter prediction processor 107, intra prediction processor 108, switching part 109, code string generator 110, addition calculator 111, and difference calculator 112. In the configuration of FIG. 2, video coding apparatus 100 divides an image input by picture unit into control blocks. Video coding apparatus 100 performs the coding processing by control block unit to generate a code string.

Each configuration of video coding apparatus 100 will sequentially be described below.

An image signal is input into picture memory 101 by picture unit in order displayed on a display device. The input image signal is stored in picture memory 101 while sorted by picture unit in coding order. When receiving a read command from block dividing part 102, picture memory 101 outputs a picture that is of the input image signal concerning the read command to block dividing part 102 and intra prediction processor 108.

Block dividing part 102 divides a picture sequentially input from picture memory 101 into the CUs each of which is a basic unit of coding processing. At this point, block dividing part 102 selects a CU size from the block sizes defined in the HEVC. As illustrated in FIG. 1, block dividing part 102 can select the CU size from four kinds of block sizes of a 64-by-64 pixel, a 32-by-32 pixel, a 16-by-16 pixel, and an 8-by-8 pixel. Generally, block dividing part 102 selects the smaller block size in a region where a pixel configuration of the input picture or motion of an object is complicated. On the other hand, block dividing part 102 selects the larger block size in a region where the pixel configuration of the input picture or the motion of the object is simple. Block dividing part 102 outputs the picture divided into the CUs to inter prediction processor 107, intra prediction processor 108, and difference calculator 112. The block output from block dividing part 102 may be one CU or a CTU (Cording Tree Unit) in which the plurality of CUs are collected. In the exemplary embodiment, the CU or the CTU corresponds to the control block. Processing of subsequent stage is performed by unit of CU block output from block dividing part 102 or by unit of CTU block unit in which the plurality of CUs are collected. For convenience, a configuration processing the CU will be described in the following description.

Inter prediction processor 107 sets a prediction processing block having the block size less than or equal to the CU size to the pixel belonging to the CU, and generates a prediction image in each prediction processing block. More specifically, based on the CU input from block dividing part 102, inter prediction processor 107 performs inter prediction processing using a reconstructed image of already-coded past or future picture stored in picture buffer 106. In the inter prediction processing, a region having the highest similarity of the pixel configuration to that of the coding target block searched from a reconstructed image of another already-coded picture (hereinafter, referred to as a "motion search"). Inter prediction processor 107 fixes which one of the reconstructed images of the pictures is referred to, and fixes how far the reconstructed image to be referred to is deviated from a position corresponding to the coding target block in the reference picture, thereby generating the prediction image (hereinafter, is referred to as "motion compensation").

At this point, inter prediction processor 107 performs the motion compensation by PU block unit into which the block of the CU unit is further divided. As illustrated in FIG. 1, in the HEVC, for example, in the case where the CU has the block size of the 32-by-32 pixel, the block size of the PU can be selected from eight kinds of block sizes of the 32-by-32 pixel, a 32-by-16 pixel, a 16-by-32 pixel, the 16-by-16 pixel, a 32-by-8 pixel, a 32-by-24 pixel, an 8-by-32 pixel, and a 24-by-32 pixel. More specifically, the CU is divided into the PU block sizes as illustrated in FIG. 3. Block 301 includes one PU having the block size of a 2N-by-2N pixel (for example, 32-by-32 pixel). Block 302 includes two PUs having the block size of an N-by-2N pixel (for example, 16-by-32 pixel). Block 303 includes two PUs having the block size of a 2N-by-N pixel (for example, 36-by-16 pixel). Block 304 includes four PUs having the block size of an N-by-N pixel (for example, 16-by-16 pixel). Block 305 includes two PUs having the block size of a 2N-by-nU pixel (for example, a 32-by-8 pixel in an upper portion and a 32-by-24 pixel in a lower portion). Block 306 includes two PUs having the block size of a 2N-by-nD pixel (for example, a 32-by-24 pixel in an upper portion and a 32-by-8 pixel in a lower portion). Block 307 includes two PUs having the block size of an nL-by-2N pixel (for example, an 8-by-32 pixel in a left portion and a 24-by-32 pixel in a right portion). Block 308 includes two PUs having the block size of an nR-by-2N pixel (for example, a 24-by-32 pixel in a left portion and an 8-by-32 pixel in a right portion).

Generally, inter prediction processor 107 selects the PU having a smaller size when the CU has the complicated pixel configuration. On the other hand, prediction processor 106 selects the PU having a larger size when the CU has the simple pixel configuration.

Intra prediction processor 108 acquires already-coded pixels located near the CU from picture buffer 106 in each CU output from block dividing part 102. Intra prediction processor 108 generates an intra prediction image using the acquired pixels. In principle, the block having the same size as the CU is used as the prediction processing block in the intra prediction processing. Exceptionally the prediction processing block that is horizontally and vertically divided into two is permitted to be used only in the case where the CU size is minimum.

Switching part 109 selects the prediction image having the better coding efficiency from the prediction images generated by inter prediction processor 107 and intra prediction processor 108, and outputs the selected prediction image to difference calculator 112. For example, switching part 109 selects one of the intra prediction method or inter prediction method so as to minimize an information amount necessary for the coding of a prediction residual and a side information amount such as a motion vector.

Difference calculator 112 generates a difference image that is of a difference value between the input image input by unit of CU from block dividing part 102 and the prediction image input by unit of CU from switching part 109. Difference calculator 112 outputs the generated difference image to orthogonal transform block size fixing part 103.

Orthogonal transform block size fixing part 103 fixes the optimum block size using a TU (Transform Unit) size in FIG. 1 from the viewpoint of coding efficiency. For example, the TU size may be fixed by comparing the information amounts, which are obtained by performing an Hadamard transform on the input difference image using the TU sizes.

Residual coefficient coder 104 performs orthogonal transform and quantization processing in each set TU block to generate a residual coefficient. Residual coefficient coder 104 outputs the generated residual coefficient to code string generator 110. More specifically, residual coefficient coder 104 performs the orthogonal transform processing on the difference image generated by difference calculator 112 by unit of TU having the block size fixed by orthogonal transform block size fixing part 103. Residual coefficient coder 104 also generates a residual coefficient signal by performing the quantization processing on an obtained orthogonal transform coefficient of each frequency component.

Residual coefficient decoder 105 performs inverse quantization processing on the residual coefficient signal input from residual coefficient coder 104 by unit of TU having the block size fixed by orthogonal transform block size fixing part 103. Residual coefficient decoder 105 also generates a reconstructed difference image by performing inverse orthogonal transform processing.

Addition calculator 111 generates the reconstructed image by adding the reconstructed difference image input from residual coefficient decoder 105 and the prediction image input from switching part 109 by basic TU.

The reconstructed image input from addition calculator 111 is stored in picture buffer 106. The reconstructed image stored in picture buffer 106 is referred to in the inter prediction processing performed on the picture coded after the present coding target picture. Alternatively, the reconstructed image is referred to in intra prediction processing performed on the CU coded later in the coding sequence.

Code string generator 110 generates the code string by performing variable-length coding and arithmetic coding on the residual coefficient signal input from residual coefficient coder 104 and a coding information signal necessary for processing of decoding other signals.

1-2. Detailed Operation During Inter Prediction Processing in Merge Mode

As described above, inter prediction processor 107 performs the motion search on the coding target block, and performs the motion compensation by generating the region in the searched reconstructed image as the prediction image. In the motion search, inter prediction processor 107 performs the evaluation of the usual inter prediction and the evaluation of the merge mode. Inter prediction processor 107 obtains the optimum PU size and the motion vector based on these evaluation results.

In the usual inter prediction, it is necessary to code motion-related information including prediction direction information, a reference picture index, and the motion vector (the difference value from a prediction vector is coded) in each PU. The prediction direction information indicates one of a temporally forward direction and a temporally backward direction with respect to a current picture. The reference picture index is an index in a forward-direction reference picture list referred to in the forward direction of the current picture or an index in a backward-direction reference picture list referred to in the backward direction.

On the other hand, in the merge mode, the coding efficiency is improved by generating a merge candidate list in which a plurality of motion vector candidates (hereinafter, referred to as merge candidates) defined in the standard with no use of the motion-related information necessary for the usual inter prediction. More specifically, in the merge mode, pieces of motion information on the PUs spatially or temporally located near the coding target PU are listed as the merge candidates to generate the merge candidate list. In the merge candidate list, the merge candidate is defined as index information indicating the motion information on the spatially or temporally near PU. That is, the index information defined in the merge candidate list is information including all the prediction direction information, the reference picture index, and the motion vector.

In the merge mode, inter prediction processor 107 selects the suitable merge candidate in the merge candidates described in the merge candidate list, and generates the actual prediction image using the motion vector indicated by the selected merge candidate.

A maximum of five candidates can be added to the merge candidate list on the standard, and fixed by a parameter described in a slice header. Examples of the merge candidate added to the merge candidate list include a spatial merging candidate, a temporal merging candidate, a combined bi-predictive merging candidate, and a zero motion vector merging candidate. The spatial merging candidate, the temporal merging candidate, the combined bi-predictive merging candidate, and the zero motion vector merging candidate are sequentially added to the merge candidate list.

A method for producing the merge candidate list of the PU will be described with reference to FIGS. 4A to 4C.

FIG. 4A is a view illustrating the position of the spatial merging candidate with respect to current PU 401. Inter prediction processor 107 sequentially evaluates pixels A1, B1, B0, A0, and B2 existing around PU 401 as the spatial merging candidate. Inter prediction processor 107 adds pixels A1, B1, B0, A0, and B2 to the merge candidate list only in the case where the pieces of motion information on the positions of the pixels are valid. In the case where the candidates in which the pieces of motion information overlap each other exist, inter prediction processor 107 follows a rule that the candidates are not added to the merge candidate list. Inter prediction processor 107 adds a maximum of four spatial merging candidates to the merge candidate list.

FIG. 4B is a view illustrating the position of the temporal merging candidate. Inter prediction processor 107 evaluates whether the motion information is valid as the temporal merging candidate in the order of pixels C0 and C1 located near current PU 402 on the temporally near reference picture. Inter prediction processor 107 adds a maximum of one temporal merging candidate to the merge candidate list. Inter prediction processor 107 fixes the temporally near reference picture using the parameter described in the slice header.

In the spatial merging candidate and the temporal merging candidate, in the case where the number of candidates in the merge candidate list is less than the maximum number of candidates (five), inter prediction processor 107 adds the combined bi-predictive merging candidate to the merge candidate list. In combined bi-prediction, inter prediction processor 107 produces a combined bi-predictive merging candidate using the candidate (the spatial merging candidate or the temporal merging candidate) already added to the merge candidate list. FIG. 4C is a table illustrating a combination of the merge candidate indexes on a List0 side and a List1 side of the combined bi-prediction. l0CandIdx indicates the merge candidate index that becomes a combination candidate on the List0 side. l1CnadIdx indicates the merge candidate index that becomes a combination candidate on the List1 side. In the case where the present merge candidate list has two candidates after the spatial merging candidate and the temporal merging candidate are added, the number of combinations is 2. Inter prediction processor 107 evaluates the two combinations of CombIdx of 0 and 1, and adds the combined bi-predictive merging candidates to the merge candidate list. In the case where the present merge candidate list has three candidates, the number of combinations is 6. Inter prediction processor 107 evaluates the six combinations of CombIdx of 0 to 5, and adds the combined bi-predictive merging candidates to the merge candidate list. In the case where the present merge candidate list has four candidates, the number of combinations is 12. Inter prediction processor 107 evaluates the 12 combinations of CombIdx of 0 and 11, and adds the combined bi-predictive merging candidates to the merge candidate list. In the case where the present merge candidate list has one candidate, inter prediction processor 107 does not perform the addition of the combined bi-predictive merging candidate.

In the case where the number of candidates in the merge candidate list is less than the maximum number of candidates (five) even after the combined bi-predictive merging candidate is added, inter prediction processor 107 adds the zero motion vector merging candidate to the merge candidate list. That is, inter prediction processor 107 sets a motion vector value to (0,0), and increments the List0 side and List1 side of a reference image from 0, thereby producing the zero motion vector merging candidate. Inter prediction processor 107 adds the produced zero motion vector merging candidate to the merge candidate list.

Through above procedure, inter prediction processor 107 produces the merge candidate list in each PU.

An operation to select the candidate used during cost evaluation processing from the candidates described in the merge candidate list will be described below.

In the merge mode, the cost evaluation processing is processing of selecting the optimum PU size and the merge candidate in each CU. For example, with the information amount necessary for the coding of the prediction residual and the information amount such as the motion vector as evaluation values, inter prediction processor 107 selects the merge candidate from the merge candidate list so as to minimize the evaluation values. In this case, inter prediction processor 107 uses the prediction residual as the evaluation value. Inter prediction processor 107 calculates the prediction residual from a difference between the generated prediction image and the coding target image. At this point, inter prediction processor 107 generates the prediction image from the pixels, which are identified by the motion vectors indicated by the candidates described in the merge candidate list, in the reconstructed image stored in picture buffer 106. Usually, because the motion vectors indicate discontinuous positions, access is obtained to a random position of picture buffer 106. Therefore, a transfer time is required compared with the case where pixels at the continuous positions are read. Because almost all the prediction images are derived by horizontally and vertically performing 8-tap filter processing on the reconstructed image, it is necessary to read the pixel in the CU and four surrounding pixels. The filter processing has a large amount of calculation because the filter processing is performed on all the pixels in the CU.

In the inter prediction including the merge mode, as illustrated in FIG. 3, the eight kinds of PU sizes of blocks 301 to 308 can be selected per one CU size. In the merge mode, each PU has the merge candidate list in which the maximum of five pieces of motion information on the candidates are listed. Therefore, the evaluations for all the PU sizes and all the merge candidates lead to the enlargement of the circuit scale in the case where the coding processing is performed in real time.

For this reason, inter prediction processor 107 restricts the number of blocks of the PU (hereinafter, referred to as an evaluation PU), which is used to generate the prediction image in order to calculate the evaluation value, and restricts the number of merge candidates that are actually used as the evaluation target in the merge candidates described in the merge candidate list.

In the case where the evaluation PU has the block size into which one CU is divided (for example, blocks 302 to 308 in FIG. 3), at least one merge candidate common to the merge candidate list of the PU (for example, block 301 in FIG. 3, hereinafter referred to as an inclusion PU) including the evaluation PU and the merge candidate list of each of the plurality of evaluation PUs included in the inclusion PU is selected as the actually-evaluated merge candidate to generate the prediction image of the evaluation PU.

For example, even if the eight kinds of blocks in FIG. 3 can arbitrarily be selected on the video coding standard, inter prediction processor 107 restricts the evaluation PU to PU0 and PU1 in block 302. Inter prediction processor 107 actually generates the prediction image with respect to PU0 and PU1 in block 302, and calculates the evaluation value in the merge mode. At this point, inter prediction processor 107 also generates the merge candidate list with respect to the PU (the inclusion PU including PU0 and PU1 that are of the evaluation PU) that is not the evaluation PU in block 301. However, because the inclusion PU is not the evaluation PU, inter prediction processor 107 does not generate the prediction image as the real processing.

At this point, for example, inter prediction processor 107 restricts the merge candidate that actually constitutes the evaluation target to three in the maximum of five merge candidates described in the merge candidate list generated in each PU.

Specifically, in the case where the evaluation PU is PU1 and PU1 in block 302, in the merge candidates described in the merge candidate list generated with respect to each of three PUs, namely, the PU in block 301 and PU0 and PU1 in block 302, inter prediction processor 107 selects at least one merge candidate as the merge candidate that actually constitutes the evaluation target from the merge candidates common to the three PUs. Therefore, inter prediction processor 107 can divert the prediction image generated with respect to the PU0 and PU1 in block 302 to the PU in block 301. That is, inter prediction processor 107 can calculate the evaluation value with respect to the PU in block 301 while omitting the processing of generating the prediction image as the actual processing with respect to the PU in block 301.

Thus, inter prediction processor 107 can perform the cost evaluation processing in the merge mode of the PU having the inclusion relationship with the evaluation target PU without increasing the calculation amount of the prediction residual calculation. As a result, without enlarging the circuit scale, the processing time can be shortened and the coding efficiency can be improved.

A cost evaluation processing operation performed by inter prediction processor 107 in the merge mode will be described below with reference to a flowchart. FIG. 5 is a flowchart illustrating a flow of the cost evaluation processing operation performed by inter prediction processor 107 in the merge mode.

Inter prediction processor 107 fixes the block size of the evaluation PU (S501). For example, inter prediction processor 107 fixes one of the block size of the PU in block 301, the block size of PU0 in block 302, and the block size in PU1 in block 302 as the evaluation PU. In this case, inter prediction processor 107 fixes the evaluation PU from a feature amount of the original image in the CU. Generally, the PU having a smaller size is selected when the CU has the complicated pixel configuration, and the PU having a larger size is selected when the CU has the simple pixel configuration. Alternatively, the PU size obtained from a result of the inter prediction motion search in which block matching is used may be fixed as the block size of the evaluation PU.

Then, inter prediction processor 107 determines whether the evaluation PU has the block size (PART_2N×2N of block 301) into which the CU is not divided (S502). When the evaluation PU has the block size into which the CU is not divided (Yes in S502), inter prediction processor 107 proceeds to S503. On the other hand, when the evaluation PU has the block size into which the CU is divided (No in S502), inter prediction processor 107 proceeds to S506.

When the evaluation PU has the block size into which the CU is not divided, inter prediction processor 107 produces the merge candidate list of the evaluation PU, and selects N (less than the maximum number of candidates, for example, three) evaluation target merge candidates on which the cost evaluation processing is performed (S503). At this point, inter prediction processor 107 may select the N evaluation target merge candidates from a head of the merge candidate list, or select the N evaluation target merge candidates such that a specific candidate such as the temporal merging candidate is included.

Then, inter prediction processor 107 performs the cost evaluation processing on the selected N evaluation target merge candidates (S504). One optimum merge candidate is fixed (S505). In the cost evaluation processing performed on the merge candidate, inter prediction processor 107 calculates the information amount necessary for the coding of the prediction residual and the evaluation value estimating the side information amount such as the header, and fixes the merge candidate in which a sum of the information amount and the evaluation value is minimized.

FIGS. 6A and 6B illustrate evaluation value equations in the cost evaluation processing for the merge candidate. In FIG. 6A, the information amount necessary for the coding of the prediction residual is set to sum of absolute differences (SAD) of the prediction residuals. The side information amount is set to a conversion value (Cost_Header) such as a merge index parameter. A sum (Cost_PU) of SAD and Cost_Header is set to the evaluation value.

On the other hand, in FIG. 6B, the information amount necessary for the coding of the prediction residual is set to sum of squared differences (SSD). The side information amount is set to the conversion value (Cost_Header) such as the merge index parameter. A sum (Cost_PU) of SSD and Cost_Header is set to the evaluation value.

The calculations for a difference value between the motion vector and the prediction vector and a quantization value are included in the calculation expression of the side information amount. Generally, the processing of calculating SAD or SSD of the prediction residual needs, for example, a difference calculation, an absolute calculation or a square calculation of each pixel in the 16-by-16-pixel block, and the processing has a large amount of calculation. On the other hand, the calculation value of the side information is the difference calculation and a multiplication calculation of one or two motion vectors, and the processing has a small amount of calculation.

The case where the evaluation PU has the block size (block size other than PART_2N×2N) into which the CU is divided (No in S502) will be described below. By way of example, it is assumed that the evaluation PU is PU0 and PU1 in block 302 (PART_N×2N).

Inter prediction processor 107 selects the N evaluation target merge candidates from each of the merge candidate lists of the two evaluation PUs (PU0 and PU1) such that the two evaluation PUs (PU0 and PU1 in block 302) into which the CU is divided and the PU (PART_2N×2N in block 301) including the two evaluation PUs include at least one common merge candidate (S506).

The merge candidate selecting method will specifically be described with reference to the drawings. FIG. 7 is a view illustrating examples of the motion vectors in the merge candidate list of the two evaluation PUs (PU0 and PU1) and the inclusion PU (PART_2N×2N). For convenience, it is assumed that all the merge candidate reference images are identical to one another, and that the derived motion vectors are different from one another. Inter prediction processor 107 selects the merge candidate common to the three merge candidate lists. In this case, motion vectors MV_c and MV_e are common to three merge candidate lists. Specifically, merge index 2 (MrgIdx=2) of PART_2N×2N, merge index 3 (MrgIdx=3) of PU0 of PART_N×2N, and merge index 0 (MrgIdx=0) of PU1 of PART_N×2N have motion vector MV_c. Merge index 4 (MrgIdx=4) of PART_2N×2N, merge index 4 (MrgIdx=4) of PU0 of PART_N×2N, and merge index 1 (MrgIdx=1) of PU1 of PART_N×2N have motion vector MV_e. Thus, in the case where the plurality of merge candidates common to the three merge candidate lists exist, inter prediction processor 107 selects the merge candidate in the order located near the head of the merge candidate list of the inclusion PU (PU of PART_2N×2N). This is because the merge candidate located near the head has the small coding amount and the good coding efficiency. Desirably one merge candidate is selected. When the plurality of common merge candidates are selected, the merge candidate near the head of the merge candidate list of the evaluation PU or the specific merge candidate such as the temporal merging candidate cannot be set to the evaluation target in the case of the small number of evaluation target merge candidates (N), but the coding efficiency is degraded. In this case, inter prediction processor 107 selects the N evaluation target merge candidates in each PU such that the N evaluation target merge candidates include the merge candidate, which is common to the three merge candidate lists and has motion vector MV_c indicating an index near the head of the merge candidate list of the inclusion PU.

FIG. 8 is a view illustrating the evaluation target merge candidate selected from the merge candidate list. At this point, it is assumed that the number of evaluation target merge candidates is two (N=2). In this case, inter prediction processor 107 sets the merge candidate of merge index 3 (MrgIdx=3) having motion vector MV_c to the evaluation target in the merge candidate list of PU0 of PART_N×2N. Similarly, inter prediction processor 107 sets the merge candidate of merge index 0 (MrgIdx=0) having motion vector MV_c to the evaluation target in the merge candidate list of PU1 of PART_N×2N.

Inter prediction processor 107 arbitrarily selects another evaluation target merge candidate for the common merge candidate from the merge candidate list with respect to both PU0 and PU1 of PART_N×2N. By way of example, inter prediction processor 107 sequentially selects the merge candidate from the head of the merge candidate list. That is, for PU0 of PART_N×2N, the merge candidate having motion vector MV_a indicated by merge index 0 (MrgIdx=0) is set to the evaluation target. Similarly, for PU1 of PART_N×2N, the merge candidate having motion vector MV_e indicated by merge index 1 (MrgIdx=1) is set to the evaluation target. Therefore, the motion vector of the evaluation target merge candidate for PU0 of PART_N×2N becomes {MV_c,MV_a}. On the other hand, the motion vector of the evaluation target merge candidate for PU1 of PART_N×2N becomes {MV_c,MV_e}.

When the merge candidate common to the three merge candidate lists does not exist, inter prediction processor 107 selects N evaluation PUs in each evaluation PU. The N evaluation PUs may be selected from the head of the merge candidate list, or the N evaluation PUs may be selected so as to include the specific candidate such as the temporal merging candidate.

In the case where the merge evaluation processing performed on the evaluation PU is longer than the merge evaluation processing performed on the inclusion PU in the processing time due to an increase in access time to the random position of picture buffer 106, inter prediction processor 107 selects the merge candidate common to the three merge candidates as many as possible to shorten the processing time.

Then, inter prediction processor 107 performs first cost evaluation processing on the evaluation target merge candidate with respect to each PU (PU0 and PU1) of PART_N×2N (S507). The merge candidate having the minimum evaluation value is selected as the optimum merge candidate (S508).

Using the prediction residual calculation value (SAD or SSD) already calculated for each PU of PART_N×2N, inter prediction processor 107 performs second cost evaluation processing on the evaluation target merge candidate with respect to the PU of PART_2N×2N (S509). Specifically, inter prediction processor 107 calculates the evaluation value of the merge candidate having merge index 2 and motion vector MV_c common to the evaluation PU. The sum of the minimum evaluation values of the two PUs (PU0 and PU1) of PART_N×2N is compared to the evaluation value of the PU of PART_2N×2N, and the smaller value is selected as the optimum PU size and the optimum merge candidate (S510).

Figure 9A:
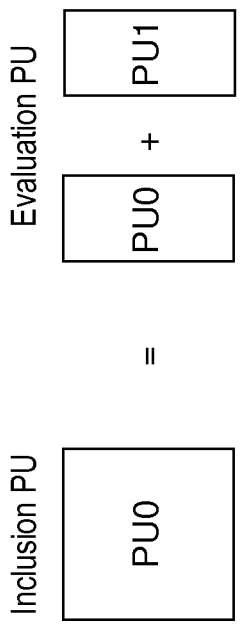
FIG. 9A is a view illustrating a relationship between prediction residuals of the two evaluation PUs and a prediction residual of the inclusion PU.

FIG. 9A is a view illustrating a relationship between the prediction residuals of the two evaluation PUs and the prediction residual of the inclusion PU. The sum of the prediction residuals of the two evaluation PUs is the prediction residual of the inclusion PU. FIG. 9B illustrates a calculation equation used to obtain the prediction residual of the inclusion PU for sum of absolute differences (SAD), and FIG. 9C illustrates a calculation equation used to obtain the prediction residual of the inclusion PU for sum of squared differences (SSD). It is assumed that the sum of the calculation values for the prediction residuals of the two evaluation PUs (PU0 and PU1) is the calculation value for the prediction residual of the inclusion PU. That is, the calculation value for the prediction residual of the inclusion PU can be obtained by the already-calculated two evaluation PUs, but it is not necessary to newly calculate the prediction residual having the large calculation amount. Therefore, the merge cost evaluation processing can be performed on the plurality of PU sizes without increasing the processing amount. As a result, the coding efficiency is improved.

1-3. Summary

As described above, video coding apparatus 100 of the exemplary embodiment includes: picture memory 101 that acquires the original image of the coding target; inter prediction processor 107 that performs at least the inter prediction on the acquired original image in each predetermined region, and generates the prediction image in the region by referring to at least one index from the candidate list in which the plurality of indexes of motion vectors that become candidates are described; difference calculator 112 that generates the residual component with respect to the original image by calculating the difference between the prediction image generated in each region and the image corresponding to the prediction image, the image being in the original image; and residual coefficient coder 104 and code string generator 110 that generate the output image stream by performing the coding processing on the residual component.

At this point, inter prediction processor 107 generates the candidate list in which the plurality of indexes of motion vectors that become the candidates are described in order to refer to the candidate list during the inter prediction with respect to at least three inter prediction blocks in the plurality of inter prediction blocks, the inter prediction blocks being applied to the original image and defined in HEVC, and, using the index described in the generated candidate list, inter prediction processor 107 calculates an evaluation value indicating coding efficiency during the use of the index and generates the prediction image based on the calculated evaluation value. When the motion vector that becomes the candidate common to the candidate lists of at least the three blocks is included, inter prediction processor 107 sets the index used to calculate the evaluation value from the generated candidate list such that at least one common motion vector is included.

That is, using the cost evaluation processing performed on the motion vector candidates described in the merge candidate lists generated in the two PU blocks (for example, PU0 and PU1 of PART_N×2N), video coding apparatus 100 performs the cost processing on the PU block (for example, the PU of PART_2N×2N including PU0 and PU1 of PART_N×2N) different from the two PU blocks. Because the cost evaluation values obtained by the two PU blocks are diverted, the processing can be performed in the merge mode without increasing the processing amount necessary for the calculation of the evaluation value in the PU block other than the PU block used to actually calculate the cost evaluation value. Therefore, the degradation of the coding efficiency can be suppressed while the enlargement of the circuit scale is prevented.

Preferably, using only a part of the indexes described in the generated candidate list, inter prediction processor 107 calculates the evaluation value indicating the coding efficiency during the use of the part of the indexes with respect to each block used to generate the candidate list. Therefore, the degradation of the coding efficiency can further be suppressed.

Preferably, when the plurality of common merge candidates (motion vectors) are included in the plurality of candidate lists, inter prediction processor 107 sets a part of the indexes used to calculate the evaluation value from the generated candidate list such that the part of the indexes includes one merge candidate (motion vector) in the plurality of common merge candidates (motion vectors).

Preferably, when the plurality of common merge candidates (motion vectors) are included in the plurality of candidate lists, inter prediction processor 107 sets a part of the merge candidates (indexes) used to calculate the evaluation value from the generated candidate list such that the part of the indexes includes one motion vector described at a position nearer a head of the merge candidate list in the plurality of common merge candidates (motion vectors).

Preferably, when the merge candidate list is generated, inter prediction processor 107 generates a candidate list with respect to three blocks having a relationship in which one block includes other two blocks. For example, the merge candidate list is generated with respect to the three blocks of the PU of PART_2N×2N including PU of PART_N×2N and PU0 and PU1 of PART_N×2N.

Preferably, only when the merge candidate (motion vector) common to the candidate lists generated by the three blocks is included, inter prediction processor 107 sets a part of the merge candidates (indexes) used to calculate the evaluation value in the three blocks such that the part of the indexes includes the common motion vector.

Preferably, using intermediate data generated in calculating the evaluation value with the common merge candidate (motion vector) in the other two blocks in the three blocks, inter prediction processor 107 calculates the evaluation value in the largest block including the other two blocks.

The video coding apparatus of the present disclosure can be applied to a broadcasting service instrument, a consumer recorder, a digital video camera, a personal computer, and a mobile phone, which are used to accumulate and transfer coded stream that is generated by coding the video signal.

What is claimed is:

1. A video coding apparatus comprising:
an acquisition part that acquires an original image of a coding target;
a prediction image generator that performs at least inter prediction on the acquired original image at each of predetermined regions, to generate a prediction image at the region by referring to at least one index from a candidate list in which a plurality of indexes of motion vectors to be candidates are described;
a difference calculator that generates a residual component with respect to the original image by calculating a difference between the prediction image generated at each of the regions and an image being in the original image and corresponding to the prediction image; and
a coder that generates an output image stream by performing coding processing on the residual component,
wherein the prediction image generator
generates the candidate list, in which the plurality of indexes of motion vectors to be the candidates are described, for being referred to during the inter prediction for each of at least three inter prediction blocks among the plurality of inter prediction blocks defined in a video coding standard and to be applied to the original image,
using an index described in the generated candidate list, calculates an evaluation value indicating coding efficiency during the use of the index with respect to each of the blocks used to generate the candidate list, to generate the prediction image based on the calculated evaluation value, and
when the motion vector that is listed as a candidate common to the candidate lists of at least the three blocks is included, sets the index used to calculate the evaluation value and listed in the generated candidate list such that the at least one common motion vector is included.

2. The video coding apparatus according to claim 1, wherein, using only a part of the indexes described in the generated candidate list, the prediction image generator calculates the evaluation value indicating the coding efficiency during the use of the part of the indexes for each of the blocks used to generate the candidate list.

3. The video coding apparatus according to claim 1, wherein, when the plurality of common motion vectors are included in the plurality of candidate lists, the prediction image generator sets a part of the indexes used to calculate the evaluation value and listed in the generated candidate list such that the part of the indexes includes one motion vector among the plurality of common motion vectors.

4. The video coding apparatus according to claim 3, wherein, when the plurality of common motion vectors are included in the plurality of candidate lists, the prediction image generator sets a part of the indexes used to calculate the evaluation value and listed in the generated candidate list such that the part of the indexes includes one motion vector described at a position nearer a head of the candidate list in the plurality of common motion vectors.

5. The video coding apparatus according to claim 1, wherein, when the candidate list is generated, the prediction image generator generates a candidate list with respect to three blocks having a relationship in which one block includes other two blocks.

6. The video coding apparatus according to claim 5, wherein, only when the motion vector listed as a candidate common to the candidate lists generated by the three blocks is included in each of the candidate lists, the prediction image generator sets a part of the indexes used to calculate the evaluation value in the three blocks such that the part of the indexes includes the common motion vector.

7. The video coding apparatus according to claim 5, wherein, using intermediate data generated in calculating the evaluation value with the common motion vector in the other two blocks out of the three blocks, the prediction image generator calculates the evaluation value in the largest block including the other two blocks.

8. A video coding method comprising:

acquiring an original image that is a coding target;

performing at least inter prediction on the acquired original image at each of predetermined regions, to generate a prediction image at the region by referring to at least one index from a candidate list in which a plurality of indexes of motion vectors to be candidates are described;

generating a residual component with respect to the original image by calculating a difference between the prediction image generated at each of the regions and an image being in the original image and corresponding to the prediction image;

generating an output image stream by performing coding processing on the residual component;

generating the candidate list, in which the plurality of indexes of motion vectors to be the candidates are described, for being referred to during the inter prediction for each of at least three inter prediction blocks among the plurality of inter prediction blocks that is defined in a video coding standard and to be applied to the original image;

using an index described in the generated candidate list, calculating an evaluation value indicating coding efficiency during the use of the index for each of the blocks on which the candidate lists are generated, to generate the prediction image based on the calculated evaluation value; and when the motion vector listed as a candidate common to the candidate lists of at least the three blocks is included in each of the candidate lists, setting the index used to calculate the evaluation value and listed in the generated candidate list such that at least one common motion vector is included.

\* \* \* \* \*